(12) United States Patent
Rosano

(10) Patent No.: US 11,687,893 B2
(45) Date of Patent: *Jun. 27, 2023

(54) SYSTEMS AND METHODS FOR UPDATING STORED CARDHOLDER ACCOUNT DATA

(71) Applicant: MASTERCARD INTERNATIONAL INCORPORATED, Purchase, NY (US)

(72) Inventor: Sharon A. Rosano, New Canaan, CT (US)

(73) Assignee: Mastercard International Incorporated, Purchase, NY (US)

(*) Notice: Subject to any disclaimer, the term of this patent is extended or adjusted under 35 U.S.C. 154(b) by 172 days.

This patent is subject to a terminal disclaimer.

(21) Appl. No.: 17/195,203

(22) Filed: Mar. 8, 2021

(65) Prior Publication Data

US 2021/0287189 A1 Sep. 16, 2021

Related U.S. Application Data

(63) Continuation of application No. 14/923,649, filed on Oct. 27, 2015, now Pat. No. 10,943,216.

(51) Int. Cl.
*G06Q 20/40* (2012.01)
*G06Q 20/34* (2012.01)
(Continued)

(52) U.S. Cl.
CPC ........... *G06Q 20/102* (2013.01); *G06Q 10/00* (2013.01); *G06Q 20/227* (2013.01);
(Continued)

(58) Field of Classification Search
CPC .... G06Q 20/102; G06Q 40/12; G06Q 20/405; G06Q 20/409
See application file for complete search history.

(56) References Cited

U.S. PATENT DOCUMENTS 7,080,035 B1 * 7/2006 Williams ............. G06Q 20/102
705/40
7,904,389 B2 3/2011 Digioacchino
(Continued)

FOREIGN PATENT DOCUMENTS

CN 1849618 A 10/2006
CN 1989520 A 6/2007
(Continued)

OTHER PUBLICATIONS

PCT International Search Report and Written Opinion, Application No. PCT/US2016/058757, dated Feb. 8, 2017, 12 pps.
(Continued)

*Primary Examiner* — Talia F Crawley
(74) *Attorney, Agent, or Firm* — Armstrong Teasdale LLP

(57) ABSTRACT

A computer-implemented method for updating stored cardholder account data is provided. The method is implemented using an account updating server in communication with a memory. The method includes receiving, from an issuer computer system, cardholder account update information associated with a plurality of cardholder accounts, identifying a merchant associated with at least one of the plurality of cardholder accounts based, at least in part, on the cardholder account update information, generating a merchant update file for the identified merchant including the cardholder account update information for the at least one of the plurality of cardholder accounts, and transmitting the merchant update file.

20 Claims, 6 Drawing Sheets

(51) Int. Cl.
   *G06Q 20/10*    (2012.01)
   *G06Q 10/00*    (2023.01)
   *G06Q 20/22*    (2012.01)
   *G06Q 40/00*    (2023.01)
   *G06Q 40/12*    (2023.01)

(52) U.S. Cl.
   CPC ......... *G06Q 20/405* (2013.01); *G06Q 20/409* (2013.01); *G06Q 40/12* (2013.12)

(56) References Cited

U.S. PATENT DOCUMENTS

| | | | |
|---|---|---|---|
| 7,925,587 B2 | 4/2011 | Digioacchino | |
| 7,966,257 B2 | 6/2011 | Digioacchino | |
| 8,036,963 B2 | 10/2011 | Carroll et al. | |
| 8,706,622 B2 | 4/2014 | Winters et al. | |
| 2005/0075977 A1* | 4/2005 | Carroll | G06Q 40/00 705/40 |
| 2008/0177638 A1* | 7/2008 | Butler | H04L 67/34 705/26.62 |
| 2009/0171839 A1* | 7/2009 | Rosano | G06Q 20/403 705/40 |
| 2010/0036769 A1* | 2/2010 | Winters | G06Q 20/10 705/40 |
| 2010/0299253 A1* | 11/2010 | Patterson | G06Q 40/02 705/40 |
| 2011/0153500 A1* | 6/2011 | DiGioacchino | G06Q 40/03 705/44 |
| 2012/0036052 A1* | 2/2012 | Carroll | G06Q 40/00 705/30 |
| 2012/0265683 A1* | 10/2012 | da Silva | G06Q 20/407 705/44 |
| 2012/0296824 A1* | 11/2012 | Rosano | G06Q 20/102 705/44 |
| 2013/0030972 A1* | 1/2013 | DiGioacchino | G06Q 20/10 705/35 |
| 2014/0032409 A1* | 1/2014 | Rosano | G06Q 20/401 705/44 |
| 2014/0052553 A1* | 2/2014 | Uzo | G06Q 20/322 705/17 |
| 2014/0258099 A1* | 9/2014 | Rosano | G06Q 20/409 705/39 |
| 2015/0199679 A1* | 7/2015 | Palanisamy | G06Q 20/385 705/67 |
| 2015/0199689 A1* | 7/2015 | Kumnick | G06Q 20/3674 705/67 |
| 2019/0007381 A1* | 1/2019 | Isaacson | G06Q 20/12 |

FOREIGN PATENT DOCUMENTS

| | | |
|---|---|---|
| EP | 1214696 A1 | 3/2001 |
| RU | 137815 U1 | 2/2014 |
| WO | 2014022076 A1 | 2/2014 |

OTHER PUBLICATIONS

China First Office Action, Application No. 201680072369.0, dated Aug. 4, 2021, 21 pps.: with English translation.

* cited by examiner

SYSTEMS AND METHODS FOR UPDATING STORED CARDHOLDER ACCOUNT DATA

CROSS REFERENCE TO RELATED APPLICATIONS

This application is a continuation application of U.S. patent application Ser. No. 14/923,649, filed Oct. 27, 2015, entitled "SYSTEMS AND METHODS FOR UPDATING STORED CARDHOLDER ACCOUNT DATA", the disclosure of which is incorporated herein by reference in its entirety.

BACKGROUND OF THE DISCLOSURE

This invention relates generally to updating account data, and, more particularly, to computer implemented methods and systems for updating stored cardholder account data without payment account owner interaction.

Merchants may store payment card information, such as payment card numbers and expiration dates, for future transactions, such as recurring transactions or e-commerce transactions. Over time this payment card information may require updating. For example, when the payment card expires or when the issuing bank changes from one payment processor to another payment processor. In these situations, a cardholder associated with the payment card may be required to inform the merchant of the updated payment card information. However, in at least some cases, the cardholder fails inform the merchant of the updated payment card information. This may result in the merchant being unable to charge the payment card, and thus, the merchant may choose to discontinue providing the recurring services to the cardholder. For example, in the case of recurring monthly payments for a gym membership, if the payment card used to pay for such monthly payments expires, the gym may cancel the cardholder's membership for failing to pay.

In some current systems, payment processors store update information for payment card accounts. When merchants or acquiring banks send billing file inquiries about stored accounts, the payment processor compares the billing file inquiries with the stored update information. The payment processor transmits the update information for the accounts in the billing file inquiry to the requesting merchant or acquiring back. Many of these current systems require the merchant or the acquiring banks to be configured to request the information on a regular basis and to request the information from the payment processor in a particular format. Also privacy concerns prevent the wholesale transmittal of updated payment card account information to all merchants.

BRIEF DESCRIPTION OF THE DISCLOSURE

In one aspect, a computer-implemented method for updating stored cardholder account data is provided. The method is implemented using an account updating server in communication with a memory. The method includes receiving, from an issuer computer system, cardholder account update information associated with a plurality of cardholder accounts, identifying a merchant associated with at least one of the plurality of cardholder accounts based, at least in part, on the cardholder account update information, generating a merchant update file for the identified merchant including the cardholder account update information for the at least one of the plurality of cardholder accounts, and transmitting the merchant update file to a third party computing device for updating stored cardholder account data.

In another aspect, an account updating server for updating stored cardholder account data is provided. The account updating server includes one or more processors communicatively coupled to one or more memory devices. The account updating server is programmed to receive, from an issuer computer system, cardholder account update information associated with a plurality of cardholder accounts, identify a merchant associated with at least one of the plurality of cardholder accounts based, at least in part, on the cardholder account update information, generate a merchant update file for the identified merchant including the cardholder account update information for the at least one of the plurality of cardholder accounts, and transmit the merchant update file to a third party computing device for updating stored cardholder account data.

In yet another aspect, a non-transitory computer-readable storage medium having computer-executable instructions embodied thereon is provided. When executed by an account updating server having at least one processor coupled to at least one memory device, the computer-executable instructions cause the processor to receive, from an issuer computer system, cardholder account update information associated with a plurality of cardholder accounts, identify a merchant associated with at least one of the plurality of cardholder accounts based, at least in part, on the cardholder account update information, generate a merchant update file for the identified merchant including the cardholder account update information for the at least one of the plurality of cardholder accounts, and transmit the merchant update file to a third party computing device for updating stored cardholder account data.

BRIEF DESCRIPTION OF THE DRAWINGS

FIG. 1 is a schematic diagram illustrating an example multi-party transaction card industry system for enabling ordinary payment-by-card transact in which merchants and card issuers do not need to have a one-to-one special relationship.

FIG. 2 is a simplified block diagram of an example computer system used for updating stored cardholder account data without cardholder interaction in accordance with one example embodiment of the present disclosure.

FIG. 3 illustrates an example configuration of a computer system shown in FIG. 2, in accordance with one embodiment of the present disclosure.

FIG. 4 illustrates an example configuration of the account updating server shown in FIG. 2, in accordance with one embodiment of the present disclosure.

FIG. 5 is a flowchart illustrating an example of a process of updating stored cardholder account data without cardholder interaction using the system shown in FIG. 2, in accordance with one embodiment of the disclosure.

FIG. 6 is a diagram of components of one or more example computing devices that may be used in the system shown in FIG. 2.

DETAILED DESCRIPTION OF THE DISCLOSURE

Figure 1:
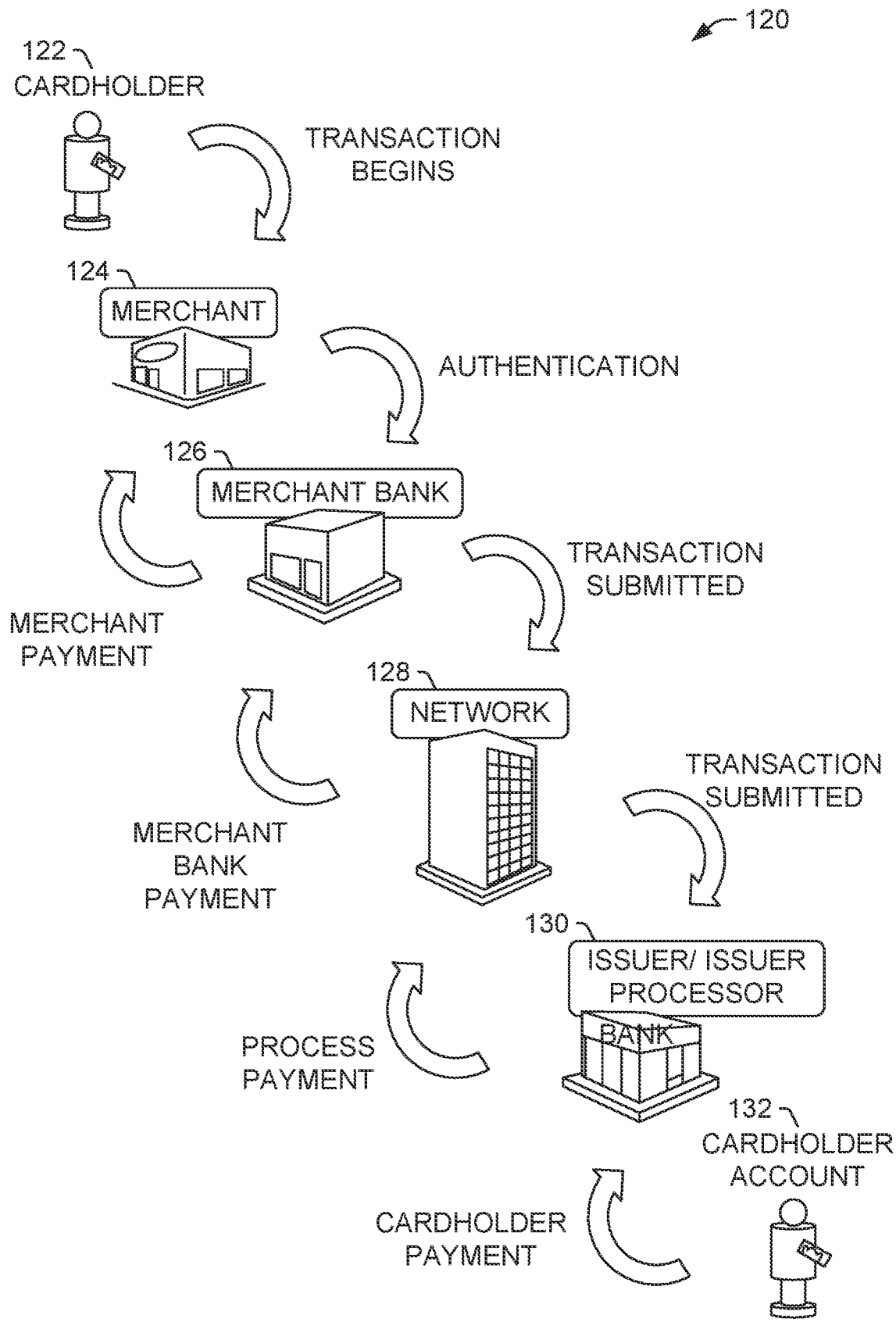
FIGS. 1-6 show example embodiments of the methods and systems described herein.

The following detailed description illustrates embodiments of the disclosure by way of example and not by way of limitation. The description clearly enables one skilled in the art to make and use the disclosure, and describes several embodiments, adaptations, variations, alternatives, and uses of the disclosure, including what is presently believed to be the best mode of carrying out the disclosure. The disclosure is described as applied to an example embodiment, namely, systems and methods for updating stored cardholder account data without cardholder interaction. More specifically, the disclosure describes an account updating server configured to receiving update information, identifying which merchants are associated with a part of the update information, generating a tailored merchant update file for the part of the update information, and transmitting the merchant update file to the identified merchants.

In some embodiments, a merchant or a merchant bank stores the account information for a cardholder. In some situations, the merchant is an online or ecommerce merchant and stores cardholder's account information including payment account number (PAN) and expiration date. In some other embodiments, the merchant also stores other authentication data such as, but not limited to, billing address, shipping address, contact information, and order history. By storing this information, the merchant decreases the difficulty of future transactions for the cardholder by not requiring the cardholder to reenter account information. In other embodiments, the merchant may store the cardholder account information for reoccurring payments, such as gym membership that requires payment of a monthly fee.

Two of the embodiments where stored account information needs to be updated include: (1) when the expiration date associated with the account information needs to be updated, such as when the expiration date has past and the account information needs to be updated with a new expiration date to be valid; and (2) when the payment account number (PAN) needs to be updated, such as when the PAN has been compromised from fraudulent activities or when the account changes from one interchange network 128 to another. In the first embodiment, the information needed to update the stored account information is the PAN associated with the account and the updated expiration date. Once the pertinent account is located based on the PAN, the old expiration date is replaced with the updated expiration date. In the second embodiment, the information needed to update the stored account information includes the old PAN, the updated PAN, and the updated expiration date associated with the new PAN. Once the pertinent account is located based on the old PAN, the old PAN is replaced with the updated PAN and the old expiration date is replaced with the updated expiration date. In some embodiments, the old expiration date is the same as the updated expiration date. In some additional embodiments, the account is located using both the old PAN and the old expiration date, or any other combination of account information to uniquely identify the account to be updated.

In the example embodiment, an account updating server receives cardholder account update information from an issuer computer system. In the example embodiment, cardholder account update information includes information for a plurality of cardholder accounts associated with an issuer bank that may have been stored by merchants. The cardholder account update information may be for the first or second embodiment.

The account updating server identifies a merchant associated with at least one of the accounts included in the received cardholder account update information. In some embodiments, each account entry in the cardholder account update information includes a list of merchants associated with the corresponding account. In some embodiments, this list is generated by the issuer bank. In other embodiments, the list of merchants is based on information that the issuer computer system received from the account updating server. In these embodiments, the account updating server determines a list of merchants that may be storing account information. In the example embodiment, these merchants may be ecommerce merchants or merchants who process a large number of recurring transactions. For example, the account updating server transmits a list of the 25 ecommerce merchants with the largest number of transactions or a list of the 25 merchants with the most recurring transactions. This list may have any number of merchants desired by the issuer bank, a combination of merchants from each category, or merchants from other desired categories. In some embodiments, the issuer computer system is configured to receive the list of merchants from the account updating server, or from another source. The issuer computer system compares the list of merchants with the accounts that need to be updated to determine whether a relationship exists between each account and any of the merchants on the list. The issuer computer system associates the merchants with determined relationships with a cardholder account with the corresponding account and stores the associated in the cardholder account update information. In still other embodiments, the account updating server generates the list of merchants to determine a merchant associated with at least one account and proceeds to update each of the merchants on that list with cardholder account update information as outlined below.

In the example embodiment, the account updating server determines the list of merchants based on card not present (CNP) transactions. The account updating server receives a plurality of CNP transactions. The account updating server analyzes the CNP transactions to determine which merchants associated with those transactions might be storing account information. In the example embodiment, the account updating server analyzes the CNP transactions in view of at least one predetermined rule. The predetermined rule may include, but is not limited to, total number of transactions associated with the merchant, average transaction amount for the merchant, the number of recurring transactions associated with the merchant, the presence of an ecommerce indicator in the transactions associated with the merchant, and the presence of a card on file indicator in the transactions associated with the merchant. For example, the account updating server analyzes the CNP transactions associated with merchant A. The account updating server determines that merchant A charges the same amount to several cardholders every month on the same day. Therefore, the account updating server may determine that merchant A has recurring transactions and has probably stored the account information for those cardholders.

In other embodiments, the account updating server is able to compare the PANs in the cardholder account update information with the PANs in the CNP transactions to determine whether or not the cardholders in question are associated with each of the merchants. For example, the account updating server determines that the PAN associated with cardholder B was used in a transaction with merchant A every month on the $4^{th}$ of the month for $10.50. Therefore, the account updating server is able to determine that merchant A has a relationship with cardholder B and is probably storing cardholder B's account information.

The account updating server generates a merchant update file for the identified merchant. In the example embodiment, the merchant update file contains cardholder account update information for the identified merchant. The merchant update file is limited to those accounts that have been determined to have a relationship with the identified merchant. In some embodiments, the merchant update file contains all of the accounts that need to be updated.

The account updating server transmits the merchant update file. In some embodiments, the account updating server transmits the merchant file to the merchant bank associated with the identified merchant. In some of these embodiments, an acquiring computer system associated with the merchant bank may be storing the account information for the identified merchant. In other of these embodiments, the acquiring computer system may transmit the merchant update file to the identified merchant. In other embodiments, the account updating server transmits the merchant update file directly to the computer system of the identified merchant. For example, the merchant associated with a first merchant computer system is a gym that processes transactions through merchant bank. In this example, the account updating server transmits the merchant update file to the acquirer computer system to be transmitted on to the first merchant computer system. In another example, the merchant associated with the second merchant computer system is a large ecommerce merchant that processes its transactions directly with an interchange network. In this example, the account updating server transmits the merchant update file to second merchant computer system.

Upon receiving the merchant update file, the system storing the account data (e.g., the acquiring computer system, the first merchant computer system, or the second merchant computer system) will search through the stored cardholder account data to find the accounts included within the merchant update file. Once the system finds a stored account matching a account listed in the merchant update file, the system updates the stored account. The system continues to check each account listed in the merchant update file against the stored accounts until all of the matches have been updated. In some embodiments, the system transmits an update complete message to the account updating server upon completion of the update.

In some further embodiments, to protect account numbers that may be stored by online merchants, tokens (also known as tokenized account identifiers) may be used in place of the account numbers to prevent compromising those account numbers in case of an account breach. Instead of storing actual PANs, the system stores tokens. In still other embodiments, to protect account numbers that may be stored by online merchants, tokens may be used in place of the account numbers to prevent compromising those account numbers in case of an account breach. The token represents the PAN. In some embodiments, the token is formatted the same as the PAN. In other embodiments, the token is a hexadecimal string or other encoded identifier that will be linked to the PAN. In some embodiments, the token is provided to the merchant by the merchant bank or by the interchange network.

In the example token embodiment, the account updating server generates tokens for each of the payments accounts in the merchant update file. The account updating server replaces the PANs in the merchant update file with the associated tokens. The merchant bank or the merchant then stores the tokens in the associated account information instead of the PANs. The Account updating server stores the PANs and the associated tokens for future reference by the interchange network. When the interchange network receives a token as a part of an authorization request message for a payment transaction, the interchange network retrieves the PAN associated with the token to identify the account, replaces the token in the authorization request message with the retrieved PAN, and transmits the authorization request message to the issuer bank.

The methods and systems described herein may be implemented using computer programming or engineering techniques including computer software, firmware, hardware, or any combination or subset. As disclosed above, at least one technical problem with prior systems is pushing updates to stored account information. The systems and methods described herein address that technical problem. The technical effect of the systems and processes described herein is achieved by performing at least one of the following steps: (a) receiving, from an issuer computer system, cardholder account update information associated with a plurality of cardholder accounts wherein the cardholder account update information includes at least a first plurality of account identifiers, a second plurality of account identifiers, and an expiration date associated with each of the second plurality of account identifiers, and wherein each of the first plurality of account identifiers is associated with one of the second plurality of account identifiers, wherein for each of the first plurality of account identifiers, the cardholder account update information includes at least one merchant associated with the account identifier, and wherein the first plurality of payment cards are associated with a first interchange network and the second plurality of payment cards are associated with a second interchange network; (b) receiving a plurality of card not present (CNP) transactions; (c) identifying the merchant based on at least one predetermined rule and the plurality of CNP transactions; (d) transmitting the identified merchant to the issuer computer system, wherein the issuer computer system is configured to compare the identified merchant with the cardholder account update information to determine if a relationship exists between the at least one merchant and one or more of the plurality of cardholder accounts; (e) identifying a merchant associated with at least one of the plurality of cardholder accounts; (f) generating a merchant update file for the identified merchant including the cardholder account update information for the at least one of the plurality of cardholder accounts; (g) generating a tokenized account identifier for each of the at least one of the plurality of cardholder accounts; (h) generating the merchant file to include the tokenized account identifier in the cardholder account update information; and (i) transmitting the merchant update file to a merchant computer system associated with the merchant, wherein the merchant computer system is configured to update one or more stored account identifiers based on the merchant update file. The resulting technical effect is that payment processors are able to transmit tailored account information updates to merchants and merchant banks without user interaction or receiving requests from the merchants and merchant banks.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling ordinary payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone or through a web or ecommerce portal. The request may also be performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In some embodiments, a payment service provider (PSP) provides merchants 124 with online services for accepting electronic payments by a variety of payment methods including credit card, bank-based payments such as direct debit, bank transfer, and real-time bank transfer based on online banking. In many cases the PSP forms a single payment gateway for the merchants 124 to multiple payment methods. A PSP can connect to multiple acquiring banks 126 and interchange networks 128. Some PSPs provide services to process other next generation payment systems including cash payments, wallets, prepaid cards or vouchers, and even paper or e-check processing.

In some embodiments, a merchant 124 or a merchant bank 126 stores the account information for cardholder 122. In some situations, merchant 124 is an online or ecommerce merchant and stores cardholder's account information including payment account number (PAN) and expiration date. In some other embodiments, merchant 124 also stores other authentication data such as, but not limited to, billing address, shipping address, contact information, and order history. By storing this information, merchant 124 decreases the difficulty of future transactions for cardholder 122 by not requiring cardholder 122 to reenter account information. In other embodiments, merchant 124 may store the cardholder account information for reoccurring payments, such as gym membership that requires payment of a monthly fee.

In still other embodiments, to protect account numbers that may be stored by online merchants, tokens (also known as tokenized account identifiers) may be used in place of the account numbers to prevent compromising those account numbers in case of an account breach. Merchant 124 or merchant bank 126 stores a token instead of the cardholder's PAN. The token represents the PAN. In some embodiments, the token is formatted the same as the PAN. In other embodiments, the token is a hexadecimal string or other encoded identifier that will be linked to the PAN. In some embodiments, the token is provided to merchant 124 by merchant bank 126 or by interchange network 128. In the case of merchant bank 126 storing a token for ecommerce or recurring transactions, the token is provided by interchange network 128.

Figure 2:
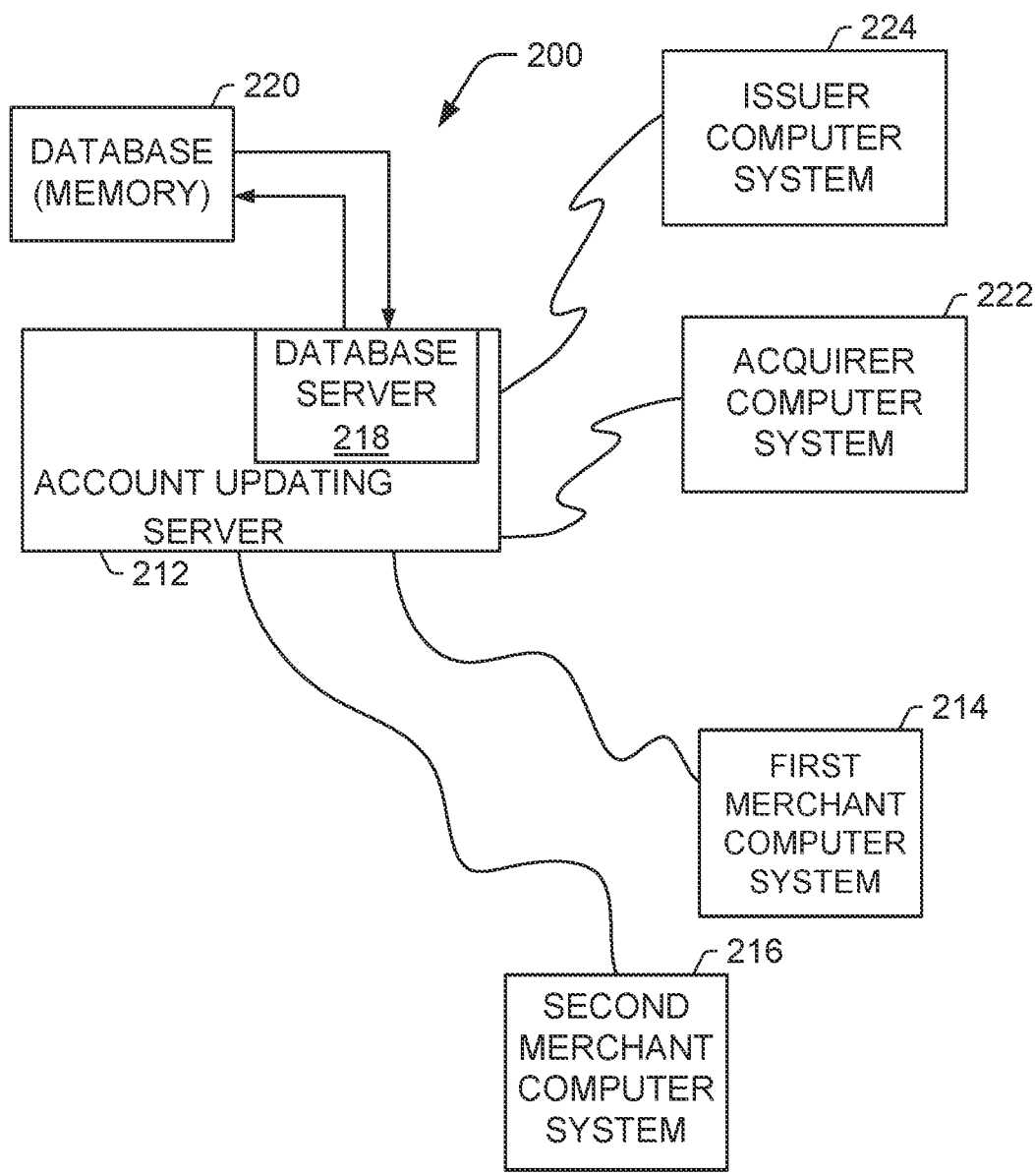

FIG. 2 is a simplified block diagram of an example system 200 used for updating stored cardholder account data without cardholder interaction in accordance with one example embodiment of the present disclosure. In the example embodiment, system 200 may be used for updating stored account information at a plurality of merchants based on the accounts that need to be updated. In addition, system 200 is a payment processing system that includes an account updating server 212 configured to update accounts. As described below in more detail, account updating server 212 is configured to receiving update information, identifying which merchants 124 (shown in FIG. 1) are associated with a part of the update information, generating a tailored merchant update file for the part of the update information, and transmitting the merchant update file to the identified merchants 124.

In the example embodiment, first merchant computer system 214 and second merchant computer system 216 are computers that include a web browser or a software application, which enables first and second merchant computer systems 214 and 216 to be in communication with account updating server 212 using the Internet. More specifically, first and second merchant computer systems 214 and 216 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. First and second merchant computer systems 214 and 216 can be any device capable of accessing the Internet including, but not limited to, a desktop computer, a laptop computer, a personal digital assistant (PDA), a cellular phone, a smartphone, a tablet, a phablet, or other web-based connectable equipment.

In the example embodiment, first and second merchant computer systems 214 and 216 are each associated with a different merchant 124 (shown in FIG. 1) and each store account information for cardholders 122 (shown in FIG. 1). In some embodiments, first and second merchant computer systems 214 and 216 are associated with merchants 124 engaged in ecommerce. In other embodiments, first and second merchant computer systems 214 and 216 are engaged in processing recurring payment transactions. In some embodiments, first and second merchant computer systems 214 and 216 are communicatively coupled with account updating server 212 through the payment card system 120. In some embodiments, first and second merchant computer system 214 and 216 act as point of sale systems and may be, but are not limited to machines that accept card swipes, online payment portals, or stored payment card numbers for recurring transactions.

A database server 218 is communicatively coupled to a database 220 that stores data. In one embodiment, database 220 includes old payment account numbers (PAN), old expiration dates associated with the old PANs, updated PANs, updated expiration dates, and tokens. In the example embodiment, database 220 is stored remotely from account updating server 212. In some embodiments, database 220 is decentralized. In the example embodiment, a person can access database 220 by logging onto account updating server 212, as described herein.

Account updating server 212 is communicatively coupled with the first and second merchant computer systems 214 and 216. In some embodiments, account updating server 212 may be associated with, or is part of the payment system, or in communication with the payment card system payment network 120, shown in FIG. 1. In other embodiments, account updating server 212 is associated with a third party and is merely in communication with the payment network 120.

An acquirer computer system 222 is communicatively coupled with account updating server 212. In the example embodiment, acquirer computer system 222 is associated with merchant bank 126 and stores account information for merchant 124. Acquirer computer system 222 is a computer that includes a web browser or a software application, which enables acquirer computer system 222 to be in communication with account updating server 212 using the Internet. More specifically, acquirer computer system 222 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Acquirer computer system 222 can be any device capable of accessing the Internet including, but not limited to, a desktop computer, a laptop computer, a personal digital assistant (PDA), a cellular phone, a smartphone, a tablet, a phablet, or other web-based connectable equipment. In some embodiments, acquirer computer system 222 is communicatively coupled with account updating server 212 through the payment card system 120.

An issuer computer system 224 is communicatively coupled with account updating server 212. In the example embodiment, issuer computer system 224 is associated with issuer bank 130. Issuer computer system 224 is a computer that includes a web browser or a software application, which enables issuer computer system 224 to be in communication with account updating server 212 using the Internet. More specifically, issuer computer system 224 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Acquirer computer system 222 can be any device capable of accessing the Internet including, but not limited to, a desktop computer, a laptop computer, a personal digital assistant (PDA), a cellular phone, a smartphone, a tablet, a phablet, or other web-based connectable equipment. In some embodiments, issuer computer system 224 is communicatively coupled with account updating server 212 through the payment card system 120.

In some embodiments, account updating server 212 may be associated with a financial transaction interchange network 128. In addition, first and second merchant computer systems 214 and 216 may be associated with merchant 124, acquirer computer system 222 may be associated with merchant bank 126, and issuer computer system 224 may be associated with issuer bank 130. Accordingly, account updating server 212, first and second merchant computer systems 214 and 216, acquirer computer system 222, and issuer computer system 224 may be utilized to process transaction data relating to purchases a cardholder 122 makes utilizing a transaction card processed by interchange network 128 and issued by the associated issuer 130.

Figure 3:
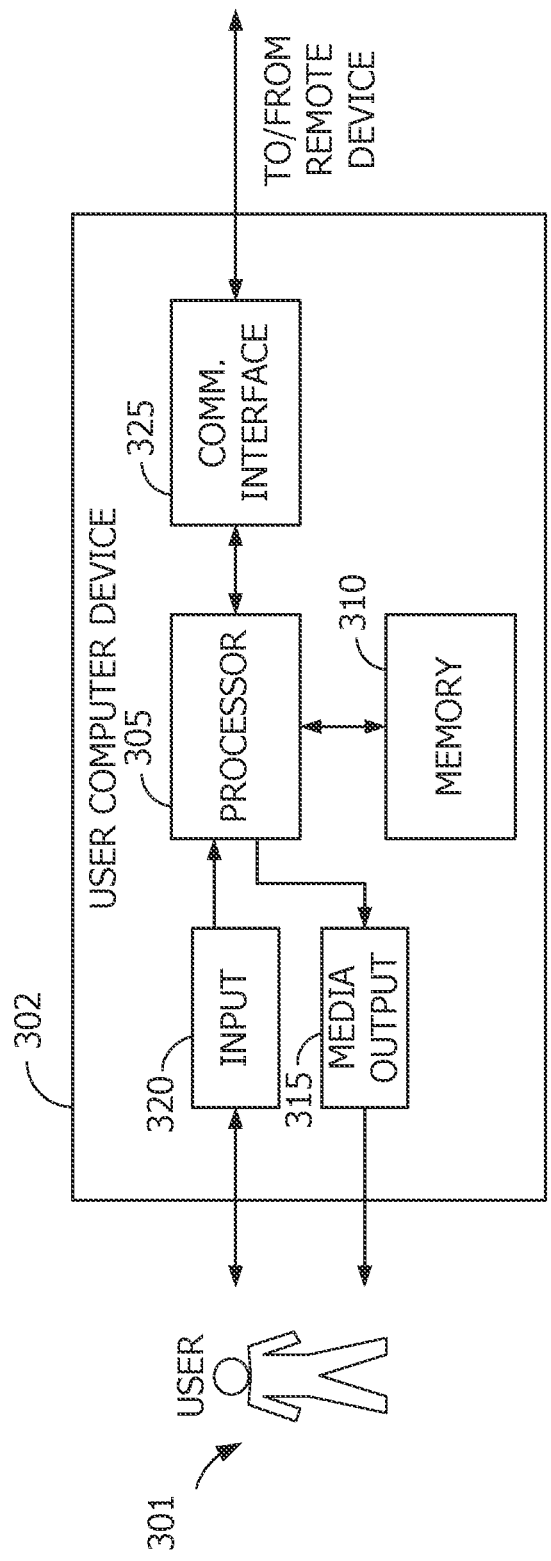

FIG. 3 illustrates an example configuration of a computer system shown in FIG. 2, in accordance with one embodiment of the present disclosure. User computer device 302 is operated by a user 301. User computer device 302 may include, but is not limited to, first merchant computer system 214, second merchant computer system 216, acquirer computer system 222, and issuer computer system 224 (all shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as account updating server 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from account updating server 212. A client application allows user 301 to interact with, for example, account updating server 212. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

Figure 4:
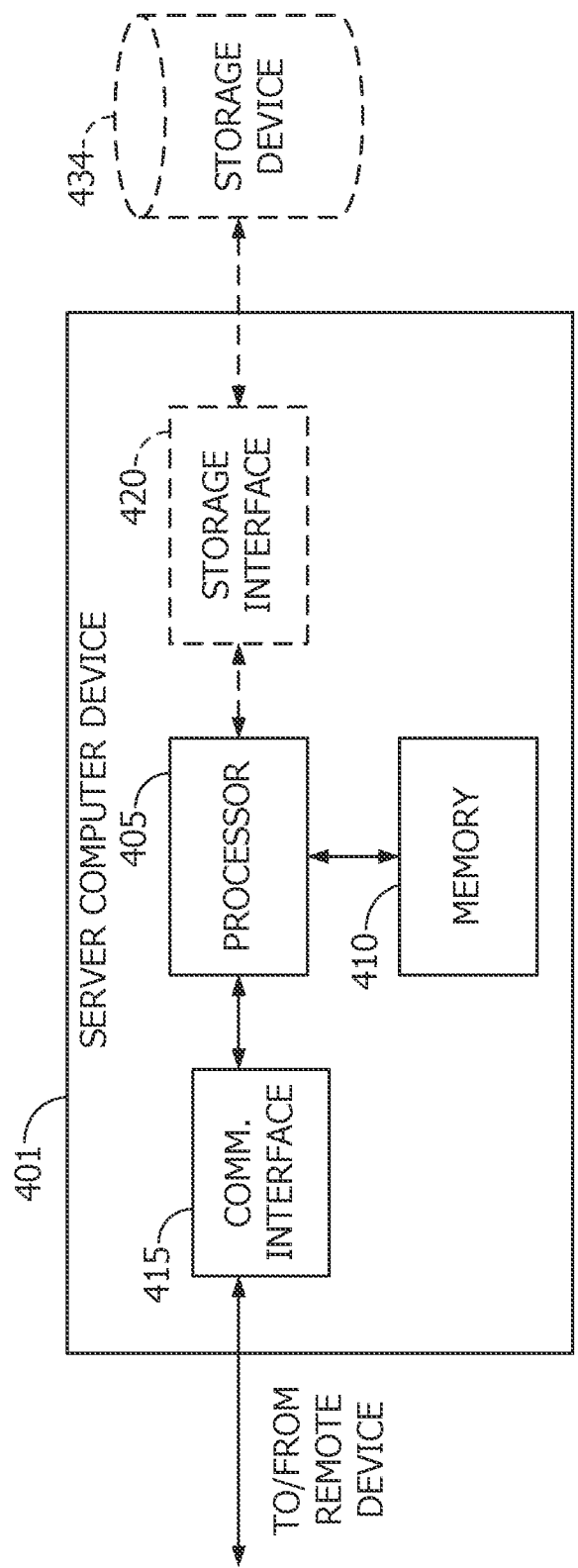

FIG. 4 illustrates an example configuration of the account updating server 212 shown in FIG. 2, in accordance with one embodiment of the present disclosure. Server computer device 401 may include, but is not limited to, database server 218, account updating server 212, acquirer computer system 222, and issuer computer system 224 (all shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, or user computer devices 302 (shown in FIG. 3). For example, communication interface 415 may receive requests from issuer computer system 224 or acquirer computer system 222, via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instruction such as illustrated in FIG. 5.

Figure 5:
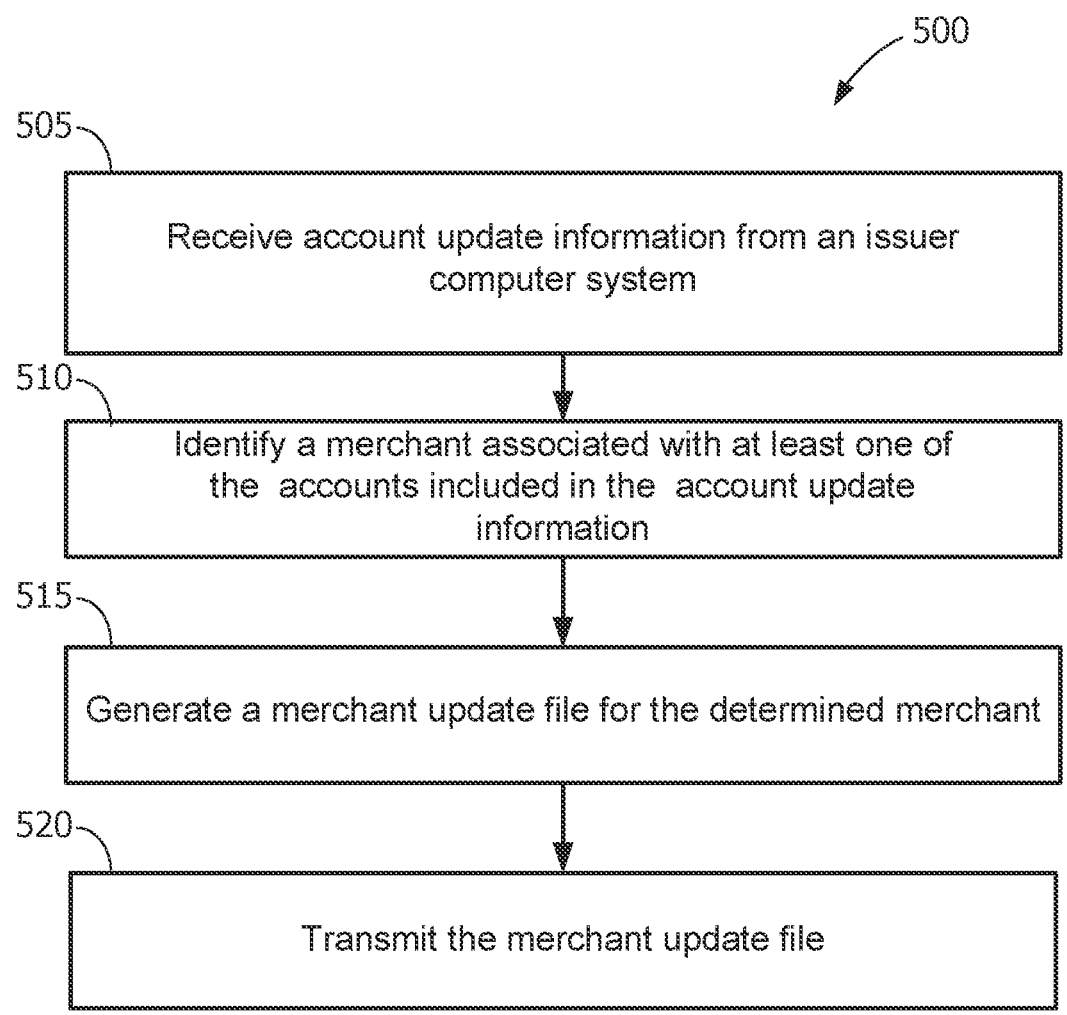

FIG. 5 is a flowchart illustrating an example of a process of updating stored cardholder account data without cardholder interaction using the system 200 (shown in FIG. 2), in accordance with one embodiment of the disclosure. Process 500 may be implemented by a computing device, for example account updating server 212 (shown in FIG. 2). In the example embodiment, account updating server 212 is in communication with first merchant computer system 214, second merchant computer system 216, acquirer computer system 222, and issuer computer system 224 (all shown in FIG. 2).

In the example embodiment, merchant 124 or merchant bank 126 (both shown in FIG. 1) stores account information for future transactions, such as ecommerce transaction or recurring transactions. The stored account information includes at least a payment account number (PAN) associated with the account and an expiration date associated with the PAN. After the expiration date, the PAN may no longer be used to access the associated account. In the example embodiment, the PAN and the associated expiration date are generated and stored by issuer bank 130 (shown in FIG. 1), for example by issuer computer system 224.

Two of the embodiments where stored account information needs to be updated include: (1) when the expiration date associated with the account information needs to be updated, such as when the expiration date has past and the account information needs to be updated with a new expiration date to be valid; and (2) when the payment account number (PAN) needs to be updated, such as when the PAN has been compromised from fraudulent activities or when the account changes from one interchange network 128 to another. In the first embodiment, the information needed to update the stored account information is the PAN associated with the account and the updated expiration date. Once the pertinent account is located based on the PAN, the old expiration date is replaced with the updated expiration date. In the second embodiment, the information needed to update the stored account information includes the old PAN, the updated PAN, and the updated expiration date associated with the new PAN. Once the pertinent account is located based on the old PAN, the old PAN is replaced with the updated PAN and the old expiration date is replaced with the updated expiration date. In some embodiments, the old expiration date is the same as the updated expiration date. In some additional embodiments, the account is located using both the old PAN and the old expiration date, or any other combination of account information to uniquely identify the account to be updated.

In the example embodiment, account updating server 212 receives 505 cardholder account update information from issuer computer system 224. In the example embodiment, cardholder account update information includes information for a plurality of cardholder accounts associated with issuer bank 130. The cardholder account update information may be for the first or second embodiment.

Account updating server 212 identifies 510 a merchant 124 associated with at least one of the accounts included in the received cardholder account update information. In some embodiments, each account entry in the cardholder account update information includes a list of merchants associated with the corresponding account. In some embodiments, this list is generated by issuer bank 130. In other embodiments, the list of merchants is based on information that the issuer computer system 224 received from account updating server 212. In these embodiments, account updating server 212 determines 510 a list of merchants that may be storing account information. Ones skilled in the art will realize that the steps outlined herein apply to both merchants 124 and merchant banks 126 that store account information. In the example embodiment, these merchants 124 may be ecommerce merchants 124 or merchants 124 who process a large number of recurring transactions. For example, account updating server 212 transmits a list of the 25 ecommerce merchants 124 with the largest number of transactions or a list of the 25 merchants 124 with the most recurring transactions. This list may have any number of merchants 124 desired by issuer bank, a combination of merchants 124 from each category, or merchants 124 from other desired categories. In some embodiments, issuer computer system 224 is configured to receive the list of merchants from account updating server 212, or from another source. Issuer computer system 224 compares the list of merchants with the accounts that need to be updated to determine whether a relationship exists between each account and any of the merchants 124 on the list. Issuer computer system 224 associates the merchants 124 with determined relationships with the corresponding account and stores the associated in the cardholder account update information. In still other embodiments, account updating server 212 generates the list of merchants to identify 510 a merchant 124 associated with at least one account and proceeds to update each of the merchants 124 on that list with cardholder account update information as outlined below.

In the example embodiment, account updating server 212 determines the list of merchants based on card not present (CNP) transactions. Account updating server 212 receives a plurality of CNP transactions. Account updating server 212 analyzes the CNP transactions to determine which merchants 124 associated with those transactions might be storing account information. In the example embodiment, account updating server 212 analyzes the CNP transactions in view of at least one predetermined rule. The predetermined rule may include, but is not limited to, total number of transactions associated with merchant 124, average transaction amount for merchant 124, the number of recurring transactions associated with merchant 124, the presence of an ecommerce indicator in the transactions associated with merchant 124, and the presence of a card on file indicator in the transactions associated with merchant 124. For example, account updating server 212 analyzes the CNP transactions associated with merchant A. Account updating server 212 determines that merchant A charges the same amount to several cardholders 122 every month on the same day. Therefore, account updating server 212 may determine that merchant A has recurring transactions and has probably stored the account information for those cardholders 122.

In other embodiments, account updating server 212 is able to compare the PANs in the cardholder account update information with the PANs in the CNP transactions to determine whether or not the cardholders 122 in question are associated with each of the merchants 124. For example, account updating server 212 determines that the PAN associated with cardholder B was used in a transaction with merchant A every month on the 4$^{th}$ of the month for $10.50. Therefore, account updating server 212 is able to determine that merchant A has a relationship with cardholder B and is probably storing cardholder B's account information.

Account updating server 212 generates 515 a merchant update file for the identified merchant 124. In the example embodiment, the merchant update file contains cardholder account update information for the identified merchant 124. The merchant update file is limited to those accounts that have been determined to have a relationship with the identified merchant 124. In some embodiments, the merchant update file contains all of the accounts that need to be updated.

Account updating server 212 transmits 520 the merchant update file. In some embodiments, account updating server 212 transmits 520 the merchant file to the merchant bank 126 associated with the identified merchant 124. In some of these embodiments, acquiring computer system 222 associated with merchant bank 126 may be storing the account information for the identified merchant 124. In other of these embodiments, acquiring computer system 222 may transmit the merchant update file to the identified merchant 124, i.e., first merchant computer system 214 or second merchant computer system 216. In other embodiments, account updating server 212 transmits 520 the merchant update file directly to the computer system of the identified merchant 124. For example, merchant 124 associated with first merchant computer system 214 is a gym that processes transactions through merchant bank 126. In this example, account updating server 212 transmits the merchant update file to the acquirer computer system 222 to be transmitted on to first merchant computer system 214. In another example, the merchant associated with second merchant computer system 216 is a large ecommerce merchant 124 that processes its transactions directly with interchange network 128. In this example, account updating server 212 transmits the merchant update file to second merchant computer system 216.

Upon receiving the merchant update file, the system storing the account data (e.g., acquiring computer system 222, first merchant computer system 214, or second merchant computer system 216) will search through the stored cardholder account data to find the accounts included within the merchant update file. Once the system finds a stored account matching a account listed in the merchant update file, the system updates the stored account. The system continues to check each account listed in the merchant update file against the stored accounts until all of the matches have been updated. In some embodiments, the system transmits an update complete message to account updating server 212 upon completion of the update.

In some further embodiments, to protect account numbers that may be stored by online merchants, tokens (also known as tokenized account identifiers) may be used in place of the account numbers to prevent compromising those account numbers in case of an account breach. Instead of storing actual PANs, the system stores tokens. In still other embodiments, to protect account numbers that may be stored by online merchants, tokens may be used in place of the account numbers to prevent compromising those account numbers in case of an account breach. The token represents the PAN. In some embodiments, the token is formatted the same as the PAN. In other embodiments, the token is a hexadecimal string or other encoded identifier that will be linked to the PAN. In some embodiments, the token is provided to merchant 124 by merchant bank 126 or by interchange network 128. In the case of merchant bank 126 storing a token for ecommerce or recurring transactions, the token is provided by interchange network 128.

In the example token embodiment, account updating server 212 generates tokens for each of the payments accounts in the merchant update file. Account updating server 212 replaces the PANs in the merchant update file with the associated tokens. Merchant bank 126 or merchant 124 then stores the tokens in the associated account information instead of the PANs. Account updating server 212 stores the PANs and the associated tokens for future reference by interchange network 128. When interchange network 128 receives a token as a part of an authorization request message for a payment transaction, interchange network 128 retrieves the PAN associated with the token to identify the account, replaces the token in the authorization request message with the retrieved PAN, and transmits the authorization request message to issuer bank 130.

Figure 6:
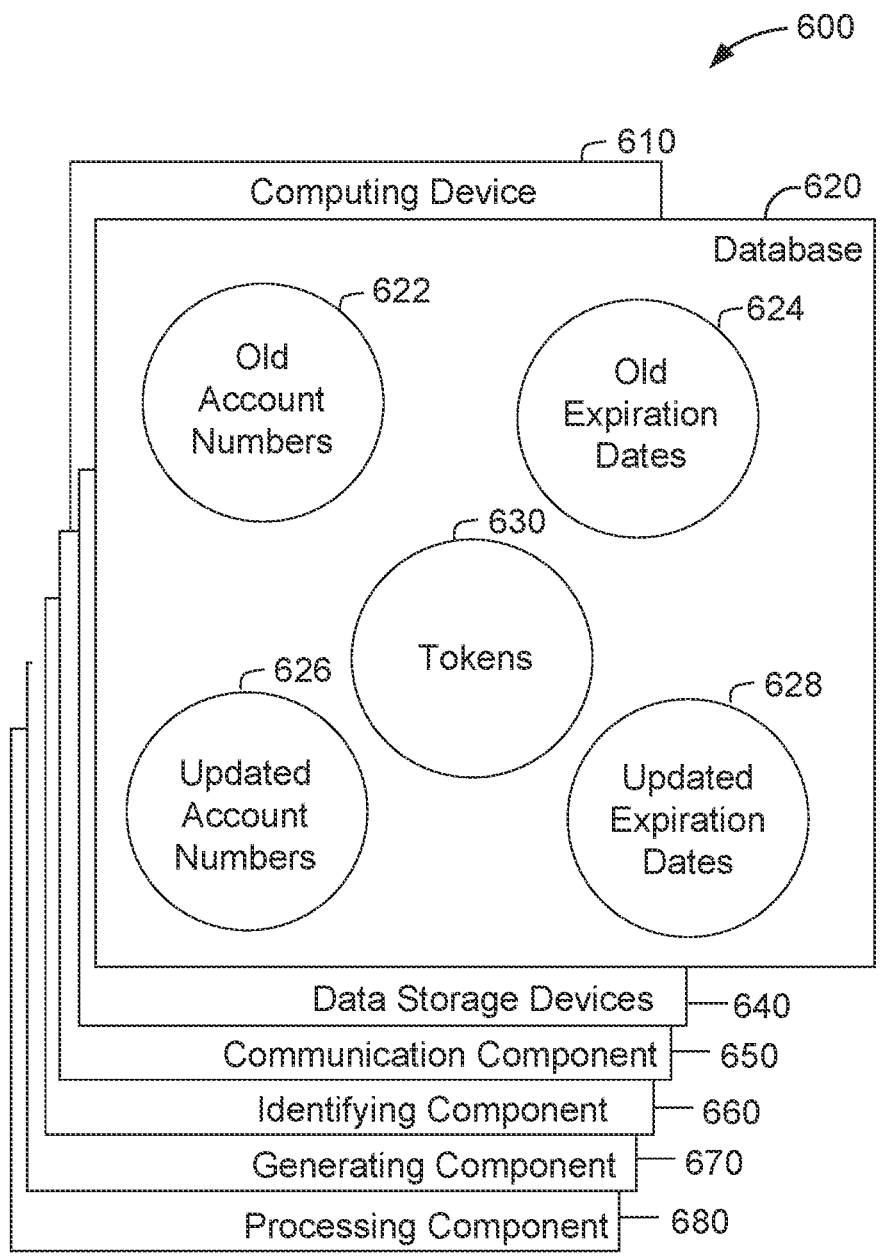

FIG. 6 is a diagram 600 of components of one or more example computing devices that may be used in the system 200 shown in FIG. 2. In some embodiments, computing device 610 is similar to account updating server 212 (shown in FIG. 2). Database 620 may be coupled with several separate components within computing device 610, which perform specific tasks. In this embodiment, database 620 includes old account numbers 622, old expiration dates 624, updated account numbers 626, updated expiration dates 628, and tokens 630. In some embodiments, database 620 is similar to database 220 (shown in FIG. 2).

Computing device 610 includes the database 620, as well as data storage devices 640. Computing device 610 also includes a communication component 650 for receiving 505 cardholder account update information and transmitting 520 the merchant update file (both shown in FIG. 5). Computing device 610 also includes an identifying component for identifying 510 a merchant 124 (shown in FIG. 1) associated with at least one of the plurality of cardholder accounts (shown in FIG. 5). Computer device 610 further includes a generating component 670 for generating 515 a merchant update file (shown in FIG. 5). A processing component 680 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for updating stored cardholder account data, said method implemented using an account updating server in communication with a memory, said method comprising:

identifying, by the account updating server, a plurality of merchants that store cardholder account data;

receiving, by the account updating server from an issuer computer system, cardholder account update information including, for each of a plurality of cardholder accounts, a previous primary account number (PAN) and an updated PAN;

retrieving, by the account updating server from the memory, a previous token associated with the previous PAN of a first of the plurality of cardholder accounts, wherein the previous token has been used in lieu of the previous PAN by a first of the identified merchants in at least one previous payment transaction;

in response to receiving the cardholder account update information, generating, by the account updating server, a new token for the updated PAN of the first cardholder account;

associating, by the account updating server within the memory, the new token, the updated PAN, the previous token, and the previous PAN such that the new token is usable by an interchange network as a reference to the updated PAN for the first cardholder account in a future payment transaction submitted by the first identified merchant;

generating, by the account updating server, a merchant update file for the first identified merchant, the merchant update file including the cardholder account update information for the first cardholder account;

modifying, by the account updating server, the merchant update file by replacing i) the updated PAN with the new token and ii) the previous PAN with the previous token; and transmitting, from the account updating server, the merchant update file to a third party computing device associated with the first merchant for updating the stored cardholder account data associated with the first cardholder account.

2. The method in accordance with claim 1, wherein generating the merchant update file further comprises including an expiration date associated with the updated PAN.

3. The method in accordance with claim 1, wherein transmitting the merchant update file to the third party computing device comprises transmitting the merchant update file to an acquiring computing device associated with the first merchant.

4. The method in accordance with claim 1, wherein transmitting the merchant update file to the third party computing device comprises transmitting the merchant update file to a merchant computing device associated with the first merchant.

5. The method in accordance with claim 1, wherein identifying the plurality of merchants that store cardholder account data comprises
retrieving, from the memory, a plurality of card not present (CNP) transactions associated with a plurality of candidate merchants; and
applying at least one predetermined rule to the plurality of CNP transactions to identify, from the plurality of candidate merchants, the plurality of merchants that store cardholder account data.

6. The method in accordance with claim 5, wherein the predetermined rule is based on at least one of a total number of transactions associated with a candidate merchant of the plurality of candidate merchants, an average transaction amount associated with the candidate merchant, a number of recurring transactions associated with the candidate merchant, an ecommerce indicator in transaction data associated with the candidate merchant, and a card on file indicator in the transaction data associated with the candidate merchant.

7. The method in accordance with claim 1, further comprising receiving, by the account updating server from the third party computing device, a message indicating completion of the update of the stored cardholder account data based on the merchant update file.

8. An account updating server for updating stored cardholder account data, said account updating server comprising at least one processor communicatively coupled to a memory, said at least one processor programmed to:
identify a plurality of merchants that store cardholder account data;
receive, from an issuer computer system, cardholder account update information including, for each of a plurality of cardholder accounts, a previous primary account number (PAN) and an updated PAN;
retrieve, from the memory, a previous token associated with the previous PAN of a first of the plurality of cardholder accounts, wherein the previous token has been used in lieu of the previous PAN by a first of the identified merchants in at least one previous payment transaction;

in response to receiving the cardholder account update information, generate a new token for the updated PAN of the first cardholder account;
associate, within the memory, the new token, the updated PAN, the previous token, and the previous PAN such that the new token is usable by an interchange network as a reference to the updated PAN for the first cardholder account in a future payment transaction submitted by the first identified merchant;
generate a merchant update file for the first identified merchant, the merchant update file including the cardholder account update information for the first cardholder account;
modify the merchant update file by replacing i) the updated PAN with the new token and ii) the previous PAN with the previous token; and
transmit the merchant update file to a third party computing device associated with the first merchant for updating the stored cardholder account data associated with the first cardholder account.

9. The account updating server in accordance with claim 8, wherein said at least one processor is further programmed to generate the merchant update file including an expiration date associated with the updated PAN.

10. The account updating server in accordance with claim 8, wherein said at least one processor is further programmed to transmit the merchant update file to the third party computing device implemented as an acquiring computing device associated with the first merchant.

11. The account updating server in accordance with claim 8, wherein said at least one processor is further programmed to transmit the merchant update file to the third party computing device implemented as a merchant computing device associated with the first merchant.

12. The account updating server in accordance with claim 8, wherein said at least one processor is further programmed to identify the plurality of merchants that store cardholder account data by:
retrieving, from the memory, a plurality of card not present (CNP) transactions associated with a plurality of candidate merchants; and
applying at least one predetermined rule to the plurality of CNP transactions to identify, from the plurality of candidate merchants, the plurality of merchants that store cardholder account data.

13. The account updating server in accordance with claim 12, wherein said at least one processor is further programmed to apply the predetermined rule based on at least one of a total number of transactions associated with a candidate merchant of the plurality of candidate merchants, an average transaction amount associated with the candidate merchant, a number of recurring transactions associated with the candidate merchant, an ecommerce indicator in transaction data associated with the candidate merchant, and a card on file indicator in the transaction data associated with the candidate merchant.

14. The account updating server in accordance with claim 8, wherein said at least one processor is further programmed to receive, from the third party computing device, a message indicating completion of the update of the stored cardholder account data based on the merchant update file.

15. A non-transitory computer-readable storage medium having computer-executable instructions embodied thereon, wherein when executed by an account updating server having at least one processor coupled to a memory, the computer-executable instructions cause the at least one processor to:

identify a plurality of merchants that store cardholder account data;

receive, from an issuer computer system, cardholder account update information including, for each of a plurality of cardholder accounts, a previous primary account number (PAN) and an updated PAN;

retrieve, from the memory, a previous token associated with the previous PAN of a first of the plurality of cardholder accounts, wherein the previous token has been used in lieu of the previous PAN by a first of the identified merchants in at least one previous payment transaction;

in response to receiving the cardholder account update information, generate a new token for the updated PAN of the first cardholder account;

associate, within the memory, the new token, the updated PAN, the previous token, and the previous PAN such that the new token is usable by an interchange network as a reference to the updated PAN for the first cardholder account in a future payment transaction submitted by the first identified merchant;

generate a merchant update file for the first identified merchant, the merchant update file including the cardholder account update information for the first cardholder account;

modify the merchant update file by replacing i) the updated PAN with the new token and ii) the previous PAN with the previous token; and transmit the merchant update file to a third party computing device associated with the first merchant for updating the stored cardholder account data associated with the first cardholder account.

16. The computer-readable storage medium in accordance with claim 15, wherein the computer-executable instructions further cause the processor to generate the merchant update file including an expiration date associated with the updated PAN.

17. The computer-readable storage medium in accordance with claim 15, wherein the computer-executable instructions further cause the processor to transmit the merchant update file to the third party computing device implemented as an acquiring computing device associated with the first merchant.

18. The computer-readable storage medium in accordance with claim 15, wherein the computer-executable instructions further cause the processor to transmit the merchant update file to the third party computing device implemented as a merchant computing device associated with the first merchant.

19. The computer-readable storage medium in accordance with claim 15, wherein the computer-executable instructions further cause the processor to identify the plurality of merchants that store cardholder account data by:

retrieving, from the memory, a plurality of card not present (CNP) transactions associated with a plurality of candidate merchants; and applying at least one predetermined rule to the plurality of CNP transactions to identify, from the plurality of candidate merchants, the plurality of merchants that store cardholder account data.

20. The computer-readable storage medium in accordance with claim 19, wherein the computer-executable instructions further cause the processor to apply the predetermined rule based on at least one of a total number of transactions associated with a candidate merchant of the plurality of candidate merchants, an average transaction amount associated with the candidate merchant, a number of recurring transactions associated with the candidate merchant, an ecommerce indicator in transaction data associated with the candidate merchant, and a card on file indicator in the transaction data associated with the candidate merchant.

* * * * *